Patented Apr. 24, 1945

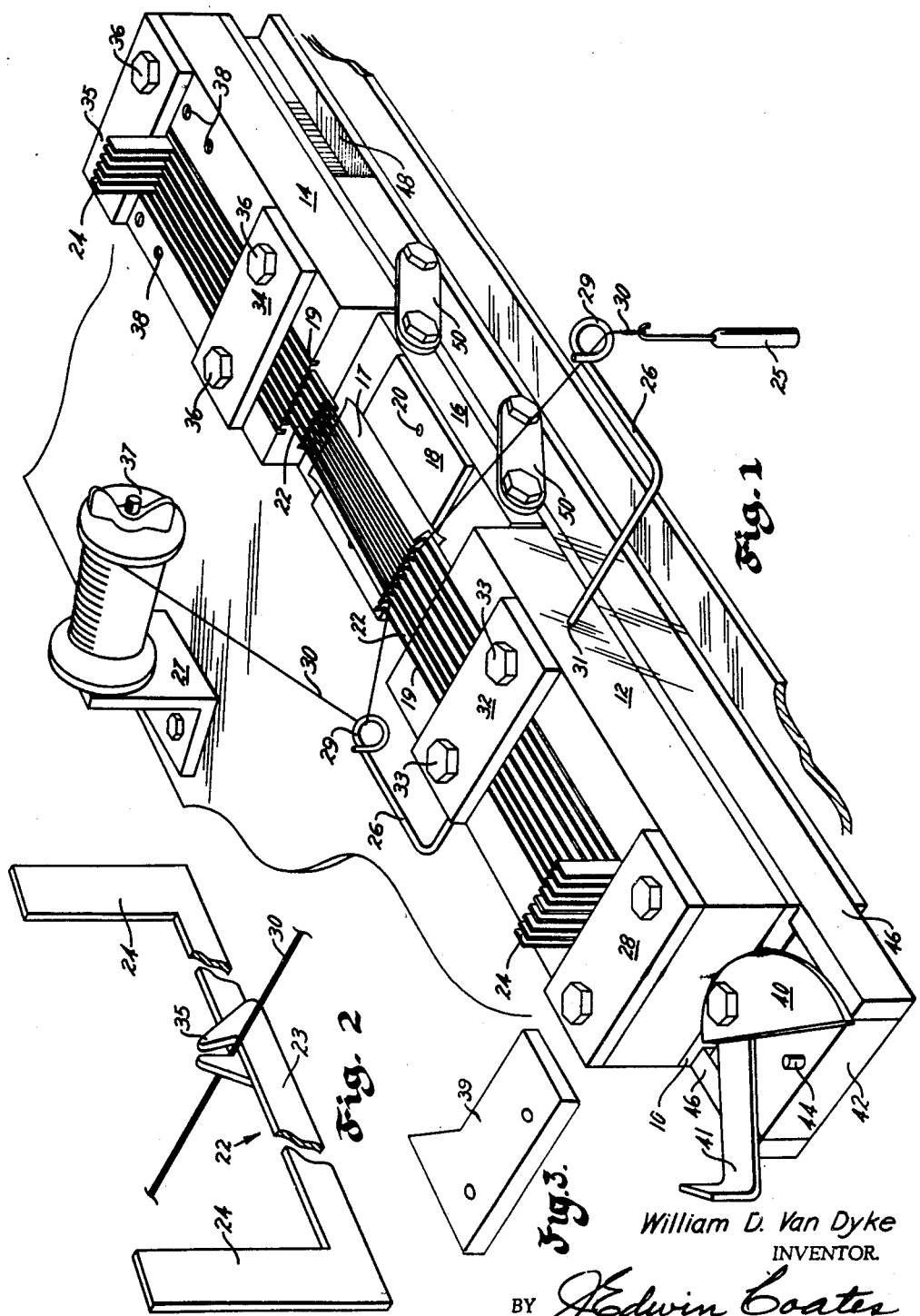

2,374,512

UNITED STATES PATENT OFFICE 2,374,512

MACHINE FOR MAKING STRAIN GAUGES

William D. Van Dyke, Hawthorne, Calif., assignor to Douglas Aircraft Company, Inc., Santa Monica, Calif.

Application July 26, 1943, Serial No. 496,231

13 Claims. (Cl. 140—71)

This invention relates to apparatus for forming electrical strain gauges of the type in which a length of resistance wire is arranged usually in several loops on a deformable backing which may be cemented or otherwise suitably attached to the surface of a member to be tested in such a manner that changes in the length of the wire due to strain in the member cause variation in the resistance of the wire thereby enabling a reading of the strain to be obtained from an electrical indicating instrument included in an electrical circuit in which said strain gauge is comprised.

Gauges of the type described are in wide use in the aircraft industry because of their handiness and reliability.

It is the general object of this invention to provide a machine for making strain gauges that will produce accurately, inexpensively, and quickly, strain gauges of the type described.

An object of the invention is to provide a machine for making strain gauges which is readily adjusted to produce a variety of gauges differing in length and/or in spacing of the wire and in the number of loops of wire.

A further object of the invention is to provide a machine for making strain gauges in which a grid of wire forming the gauge is held by the machine until the grid has been cemented to a deformable support such as a sheet of thin, tough paper.

Another object of the invention is to provide a machine for making strain gauges which will form each bend of a grid of wire uniformly and in which the tension on the wire during fabrication is uniform.

Still another object of the invention is to provide a machine comprising a minimum number of parts so that the operator can quickly learn to manipulate the machine to produce mechanically and electrically uniform gauges.

A still further object of the invention is to provide a machine for making strain gauges having a minimum of parts yet providing fully for all necessary adjustments.

Another feature of the invention is to provide a machine in which a wire grid may be formed with very small loops and with wires closely but accurately spaced.

Still further objects of the invention will hereinafter appear in the accompanying description and illustrative drawing.

In the drawing a machine embodying the invention is shown in a form which has been in actual use for a considerable period and has proved very satisfactory, but it is to be understood that various modifications may be made in the machine illustrated without departing from the invention, the scope of which is defined in the appended claims.

In the drawing, in which identical numerals indicate identical parts,

Figure 1 is a perspective view of the complete machine.

Figure 2 is a view on an enlarged scale showing two hook members in operative relation with their hook portions overlapped to form a wire receiving channel.

Figure 3 shows a shaper which may be used with the machine to obtain various special forms of grid.

In Figure 1 the base of the strain gauge making machine is indicated by 10, a block 12, preferably of metal, being arranged at one end of the base and a second block 14 at the opposite end of the base. A space is left between blocks 12 and 14 in which is arranged a table 16 mounted for vertical movement. The table 16 is preferably furnished with a detachable top 18 positioned on pins 20. The upper surfaces of both blocks 12 and 14 are formed with a plurality of narrow grooves 19 to slidably receive hook members 22 which are shown on an enlarged scale in Figure 2.

A wire guide comprising a pair of arms 26 formed with guiding eyes 29 at their ends is mounted in a bore 31 in block 12 and held by set screws 33 which may also serve to hold other parts later referred to. A spool 37 of wire 30 is supported by a bracket 27 having means (not shown) for adjustably tensioning the wire. The bracket 27 may be of any suitable construction.

The hooks may be formed in any suitable manner. In the strain gauge making machine herein described the hooks are the standard machine knitting needles used in the manufacture of silk hosiery, from each of which the latch has been removed and the hook end of each of which has been shortened to enlarge the entrance opening thereof. The resulting member, herein referred to as a hook is shown in Figure 2 in simplified form, since specific configuration of the hook is of no importance except as to the upturned end or lug 24 and the hook end 35, provided the hook ends are so formed that they can be closely spaced. The spacing between adjacent hook ends of one set preferably approximately equals the width of one hook end plus twice the wire diameter. It will be seen from Figure 2 that the hook ends 35 of the two hooks, when overlapped with their hook entrance openings both facing upwardly and the hook shanks 23 extending in opposite directions, form an open channel in which the wire strand 30 can be laid and tautly held therein by a weight 25 attached to the free end of the wire.

Since strain gauges are used to measure the strain in members of all shapes and sizes a satisfactory machine for making them must be readily adaptable to make gauges of a variety of widths and lengths and of spacings of the loops of wire. Constructional features of the machine of this invention by which a variety of gauges may be formed will be later described.

The positioning longitudinally of one set of hooks is not changed since adjustment longitudinally of the opposite set of hooks will give the required degree of adaptability in the use of the machine, a fact which simplifies the manufacturing procedure and the manipulation of the machine. The hooks carried by block 12 are transversely aligned against back plate 28 by abutting the lugs 24 of the hooks against the plate, a second retaining plate 32 preventing vertical displacement of the shanks of the hooks from the grooves 19.

During operation of the machine to produce one or more strain gauges of a specified length, number of wires, and spacing of wires, the only movement of the hooks consists of a reciprocation of the hooks 22 carried by block 14. The means provided to control the required movement comprise a front stop 34 secured to the block 14 by holding studs 36 limiting forward movement of hooks 22 by engagement of lugs 24 with the stop 34. The limit of the forward travel of rightward hooks 22 is unvaried since the limit position required is that positioning the hook ends properly to form a channel (Figure 2) to receive resistance wire 30, but the extent of rearward travel of these hooks depends on the length of the strain gauge to be produced. The limit of rearward travel is set by back stop 35 which may be adjusted by locating the holding studs 36 in a selected pair of a series of tapped bores 38. This construction allows sufficient flexibility to produce strain gauges of the lengths in general use and also enables the back stop 35 to fulfill a further function which will be now described.

It will be seen that different widths of gauge are made by using a larger or smaller number of hooks. When a grid has been formed it has to be removed from the hooks and in order that this may be readily effected with the form of hook used in the machine, the rightward hooks 22 have to be given a forward movement of about .02 of an inch. This is made possible by drilling the holes in back stop 35, through which the holding studs 36 pass, sufficiently oversize to enable a forward push on stop 35 to move all hooks 22 forwardly this required distance.

When the grid has been formed and is still suspended between the hooks it is necessary to mount in on a backing, for which purpose rice paper has been found suitable because of its thin but uniform structure. A paper backing 17 is carried by the table top 18 of table 16 which is raised to bring it just below the grid by raising the table. The means to raise the table comprise a cam 40 rotated by arm 41, and a stop 44 limiting movement of the arm to bring the table to the correct height. Cam 40 bears against the end of block 12 and is pivoted to a slide 42 which has arms 46 sliding in grooves 48 in the base 10 of the machine. Swinging links 50 are pivoted at one end to arms 46 and at their other ends to the table 16 and are so related to the throw of arms 46 that they are brought nearly to a vertical position at the upper limit of their movement; thus no force is required to maintain the table in raised position, leaving both hands of the operator free to effect cementing the grid of resistance wire to the backing. The table can be returned to lowered position by returning the handle 41 to its initial position and pulling the slide 42 in the opposite direction.

The grid is then cemented to the backing by flowing a suitable material over the grid and surface of the backing as close as possible to but not touching the hooks. The material is allowed to dry, after which the wire is cut between each corner at that end of the grid and the adjacent wire guide. Two lead wires are soldered to the resistance wire ends, while the wire grid is still held by the hooks or later as preferred, and rightward hooks 22 are moved slightly to the left to release the grid. It should be noted that a variety of special forms of grid may be made by mounting plates 39, one of which is shown in Figure 3 on the front and/or back stops to modify the limit of travel of the hooks. The strain gauge is then removed and completed by cementing reinforcing strips over the loops at the ends of the wire grid and over leads soldered to the resistance wire.

While the strain gauge making machine may be made as an automatic machine it is found that, in view of the varities in form of gauge that may be called for and the delicacy of some operations necessary to secure a satisfactory product, an excellent output is secured by a manually operated machine. It is therefore to be understood that in the following description of the working of the machine various operations manually carried out may be effected by mechanical means if preferred.

The characteristics of a good strain gauge and the operational steps required in its manufacture will be set forth so that it can be seen that the method and machine of this invention are such as to secure a satisfactory product.

The functioning of strain gauges of the type with which this invention is concerned depends on the variation of the electrical resistance of a wire carrying an electric current, directly in proportion to the variations in the value of the strain in the wire resulting from the stress transmitted to the gauge by the part under test. Since the wires are acting as electrical conductors they are subject to electrical phenomena such as self induction which varies with the spacing between adjacent wires, and such as leakage losses which are increased by contact with electrically conductive surfaces due to faulty insulation of the wire, which phenomena may materially affect the readings obtained.

It will be evident that in order to make the individual gauges of a given lot give uniform readings the gauges must be uniformly made and the methods used should be such as to avoid the possibility of variations between any two gauges of the same value and, of course, be proof against faulty workmanship as far as possible.

In the method used the wire from which the gauges are made is under a uniform tension throughout the formation of the grid; the spacing of the grid wires is exact and the formed grid is held by the forming members until the grid has been solidly cemented to a backing, the cement serving also to insulate the gauge wires from one another. In the cementing method used, the backing member is mounted on a table, and raised until the backing lies just under the wires in position to receive a covering of suitable quick-drying cement such as "Glyptol" which coats the wire of the grid and secures it firmly and uniformly to the backing; this step both insulates the wire and ensures equal distribution of the stress transmitted to the wire grid through the backing which is cemented to the part being tested. The use of mechanical means to bring the backing into a position in which it extends parallel to and under the grid ensures uniformity of the cementing of the gauges.

As the bends in the wire at the ends of the grid contribute relatively little to the significance of the readings given by the device, and since they participate but slightly in the strain of the wire but only offer resistance to the flow of electric current, the radius of the bends should be kept as small as possible; this is secured according to the invention by using small hooks of precision manufacture such as are used in machine knitting of fine fibers.

Uniformity of tension in the wire is obtained by suspending a small weight 25 of the order of 75 grs. on the free end of the strand of wire 30 sufficient to form the wire grid.

For many uses, a strain gauge should be as small as practicable. For example the smaller the gauge the more accurately will it record the strain at any particular point of the member tested. A large gauge would cover points on the member of different strain values. Obviously the straight runs of the grid should be parallel if with any given spacing and wire of any given gauge, minimum size of strain gauge is to be most fully realized.

This parallelism may be secured by the method and apparatus of this invention. The grooves and hooks on one block are staggered with respect to the grooves and hooks on the other block. If the wire is to extend between hook ends in exactly parallel runs, it is apparent that the spacing between centers of the grooves on each block must be just slightly greater than twice the width of the hook ends around which the wire is wrapped and that this slight excess in width must be twice the diameter of the wire used. The dimensions of the machine are preferably such as to fulfill these conditions within practical limits.

Various elements which cooperate in the functioning of the machine of the invention do not call for extended mention. Such elements are the bracket 27 having adjustable tensioning means holding a spool of fine wire 30. A suitable material for the resistance wire is "Copel" wire, of a diameter of .002 for a strain gauge of a resistance of 100 ohms, or "Advance" wire of a diameter of .001 for a gauge of 400 ohm resistance.

Use is also made of a small tool to move back the movable hooks which may be made by fitting a hook of the kind used in the machine in a suitable handle.

A light metal strip or piece of bar serves to move the rightward movable hooks as a unit to their forward position, and any suitable means such as a spatula can be used to spread the cement over the grid.

The first step in operating the machine is to draw a length of wire from the spool, threading it through the wire guides 26 and attaching the weight 25 to the free end of the wire. This length may be about eighteen inches for a widely used size of strain gauge.

It is to be assumed that the back stop of the movable set of hooks has been adjusted for the length of strain gauge to be made and the number of hooks to be used has been determined.

The movable hooks are then moved forward to the limit of their travel as determined by the front stop; at this point in the process the hook ends of the fixed and movable hooks will form an open channel as shown in Figure 2, and the wire extending between the wire guides is pulled forward and laid in this channel. The operator then withdraws the movable hooks one by one by engaging the lugs 24 with the withdrawing tool, commencing with the hook farthest from the weighted end of the wire, and bringing the hook back until the lug contacts the back stop, continuing with each movable hook until all are in withdrawn position. It will be noted that since the resistance to the movement of the hooks is the same for each pair of fixed and movable hooks, being the frictional resistance of moving the wire over half the perimeter of the moving hook end and one quarter of the perimeter of the stationary hook end, while the pull of the weight is constant, the stress on each run of wire is the same.

The wire grid formed at the end of this operation is suspended taut between the hook ends of the two sets, the frictional grip of the mounting of the hooks in the blocks being sufficient to retain the movable hooks in retracted position.

The movable table 16 is now raised by the operator to bring the backing into a position parallel to and immediately below the grid of wire. To effect this cam 40 is turned by handle 41 until it strikes stop 44, the engagement of the surface of the cam with the end of block 12 displaces the slide arms 46 carrying the pivot pins of links 50 to the left thereby forcing the table upwardly, and the stop 44 limits the movement of the table leaving the table top 18 at the correct height. In this position the pivots of the links are sufficiently on dead center to support the table in position without need to hold the handle of the cam 40, leaving the operator free to effect the cementing of the wire grid to the backing. The cementing operation is carried out by flowing cementing material such as "Glyptol" over the wires in sufficient quantity to completely coat them and form a film in which the wires are embedded, covering the whole of the backing excepting the area close up to the loops of wire at the ends of the grid, the loops being covered after the grid has been removed from the hooks. The cement coated grid and backing are left to dry while still retained on the hooks. This takes very little time when using "Glyptol," little more than one minute being required. When thoroughly dried the grid is released by moving the whole rightward set of movable hooks 22 toward the fixed leftward set by moving the back stop 34 forward slightly as permitted by the oversize holes therein, the wire is cut between the grid and the wire guides, and the grid is lifted clear of the hooks. The loops and leads are now cemented down and preferably covered by strips of the backing material, this operation completing the fabrication of the strain gauge. The time taken to make a grid may be as little as five minutes and the uniformity of the gauges produced is of a very high order, individual calibration not being required for a tolerance of 2%.

In the various multiple arrangements of strain gauges, the gauges formed by the machine are preferably cemented face down on a common backing, obtaining the advantage of retaining only one thickness of backing between the wire grid and the part under test to which the backing is cemented.

It is believed that the apparatus of this invention provides a very meritorious advance in the art since strain gauges may thus be produced rapidly, accurately, and with mechanical and electrical uniformity, thus facilitating the production and use of an important device used in the testing of airplanes and other structures.

I claim:

1. A machine for making strain gauges comprising: two sets of wire retaining hooks; means for guiding said hooks into interleaved relation so that the hook ends of one set alternate with the hook ends of the second set, to provide a transversely extending space therebetween with the hook ends of each set of hooks beyond, and on opposite sides of, the longitudinal axis of said transversely extending space for the reception of a wire, and into separated relation of one set of hook ends relatively to the other set of hook ends to form a grid of wire; means for maintaining a length of wire under constant tension in said space and during the formation of said grid; a movable table arranged with its surface substantially parallel to but spaced from said grid and between said separated sets of hook ends; and means for moving said table so that a backing carried by said table is brought against said grid to enable said grid to be cemented to said backing.

2. A machine for making strain gauges comprising: two sets of wire retaining hooks; means for guiding said hooks into interleaved relation so that the hook ends of one set alternate with the hook ends of the second set to provide a transversely extending space therebetween with the hook ends of each set of hooks beyond, and on opposite sides of, the longitudinal axis of said transversely extending space; means for holding one end of a length of wire and for applying a constant tension to the other end of said length of wire; guiding means acting to hold a length of wire in said space from which it may be brought into engagement with said hook ends while in said interleaved relation; elements on said hooks by which the hook ends of one set of hooks may be individually and successively separated from the hook ends of the other set of hooks to form a grid of wire; a movable table arranged with its surface substantially parallel to but spaced from said grid and between said sets of separated hook ends; means for moving said table so that a backing element carried by said table is brought against said grid to enable said grid to be cemented to said backing; and means to move at least one of said sets of hook ends to free said grid.

3. A machine for making strain gauges comprising: a first set of wire retaining hooks adjustably mounted in a support; a second set of retaining hooks mounted for sliding movement in a second support, said supports acting to maintain both sets of hooks in the same horizontal plane; elements on said hooks by which said slidably mounted hooks may be moved initially into interleaved relation with said adjustably mounted hooks with the hook ends of the movable set of hooks projecting sufficiently beyond the hook ends of the adjustably mounted set of hooks to form a channel and may be subsequently individually and successively moved to cause the hook ends thereof to pass and move a substantial distance beyond said first set of hook ends; means for holding one end of a length of wire and for applying constant tension to the other end of said length of wire; guiding means acting to hold a length of wire in position to be disposed in said channel and therein brought into engagement with said hooks while in said interleaved relation; a movable table arranged with its surface substantially parallel to but spaced from said grid and between said separated sets of hook ends; means for moving said table so that a backing carried by said table is brought against said grid to enable said grid to be cemented to said backing; and means to move said hooks to free said grid.

4. A machine for making strain gauges comprising: a first set of wire retaining hooks rectilinearly adjustably mounted in a support; a second set of alternatingly arranged hooks mounted for rectilinear sliding movement in the opposite direction in a second support, said supports acting to maintain both sets of hooks in the same horizontal plane; wire engaging hook ends on said hooks of one set; oppositely directed wire engaging hook ends on the hooks of the other set; upstanding lugs on said slidable hooks; an adjustable front stop limiting the forward movement of said slidable hooks whereby the machine may be set to make gauges of different length; a backstop limiting the rearward movement of said slidable hooks; means for maintaining a length of wire under constant tension in position to be brought into engagement with said hook ends while in proximate, oppositely facing, interleaved relation, and to be formed into a grid suspended between said hooks when said slidable hooks are moved to separate the hook ends thereof from the other set of hook ends; a movable table arranged with its surface substantially parallel to but spaced from said grid and between said separated sets of hook ends; means for moving said table so that a backing carried by said table is brought against said grid to enable said grid to be cemented to said backing; and means to relatively move said hooks to move said separated sets of hook ends toward each other to free said grid.

5. A machine for making strain gauges comprising: a base; a block at each end of said base; a plurality of grooves in the upper surface of each of said blocks; a set of operatively fixed hooks adjustably mounted in the grooves of one block; a second set of hooks slidably mounted in the grooves of the second block, the hooks of both sets being arranged in the same horizontal plane; upstanding lugs on said slidable hooks whereby the hook ends of the slidable hooks may be moved initially into transversely interleaved and proximately facing relation to the hook ends of the set of fixed hooks to form a channel; means for holding one end of a length of wire and for applying constant tension to the other end of said length of wire; and guiding means acting to hold the length of wire in position to be placed in said channel and brought into engagement with said hooks while in said interleaved relation; the slidable hooks being individually and successively movable to separate the hook ends thereof from the other set of hook ends by manipulation of said upstanding lugs; a table arranged for vertical movement with its surface substantially parallel to but spaced from said grid and between said separated sets of hooks; means for moving said table so that a backing carried by said table is brought against said grid to enable said grid to be cemented to said backing; and means to move said slidable hooks to free said grid.

6. A machine for making strain gauges comprising: a base; a block at each end of said base; a plurality of grooves in the upper surface of said blocks; a set of hooks adjustably mounted in said grooves of one block; a second set of hooks slidably mounted in the grooves of the second block, the hooks of both sets being arranged in the same horizontal plane; a removable retainer member holding said adjustably mounted set of hooks in one grooved block; a front stop on the block in which the slidable hooks are mounted acting to limit the forward movement of said hooks; an adjustable backstop on said latter block to limit the rearward movement of said movable hooks; upstanding lugs on both sets of hooks whereby the slidable hooks may be moved into interleaved relation to the set of fixed hooks, the hooked ends of the movable set of hooks projecting sufficiently beyond the hooked ends of the fixed set of hooks to form a channel; means for holding one end of a length of wire and for applying constant tension to the other end of said length of wire; guiding means acting to hold a length of wire in position to be brought into engagement with said hooks while in said interleaved relation; lugs projecting from the hooks by which the hooks of one set of hooks may be individually and successively separated from the other set of hooks; a table arranged for vertical movement with its surface substantially parallel to but spaced from said grid and between said sets of hooks; means for moving said table so that a backing carried by said table is brought against said grid to enable said grid to be cemented to said backing; and means to move said slidable hooks to free said grid.

7. A machine for making strain gauges comprising: a base; a block at each end of said base; a plurality of grooves in the upper surface of said blocks; a set of hooks adjustably mounted in said grooves of one block; a second set of hooks slidably mounted in the grooves of the second block, the hooks of both sets being arranged in the same horizontal plane; means for maintaining a length of wire under constant tension in position to be brought into engagement with said hooks while in said interleaved relation; lugs on said hooks by which one set of hooks may be separated from the other set of hooks thereby forming a grid of wire suspended by said hooks; a table arranged for vertical movement with its surface substantially parallel to but spaced from said wire grid and between said sets of hooks; cam means for moving said table so that a backing element such as a sheet of paper carried by said table is brought against said grid to enable said grid to be cemented to said backing; and means to move said set of slidable hooks to free said wire grid.

8. A machine for making wire strain gauges as set forth in claim 7 having means to move said set of slidable hooks to free said wire grid comprising an adjustable back stop plate provided with apertures, studs passing through said apertures and screwing into the block carrying the movable hooks, the apertures in said back stop plate being so formed as to enable the back stop plate to have a limited forward movement.

9. A machine for making strain gauges as claimed in claim 1 comprising: a table mounted for vertical movement and supporting a backing element, and cam means for raising said table into proximate position relative to said backing to enable said grid to be cemented to said backing element.

10. A machine as claimed in Claim 7 in which said cam means comprise a cam engaging against one end of the machine frame and mounted on a slide having arms guided in grooves extending below said table, swinging links pivoted at one end to said table and at their other end to said arms, rotation of said cam causing longitudinal movement of the arms and consequent vertical movement of said table.

11. In a machine for making electric strain gauges comprising a grid of conductor wire and an elongatable sheeted support to which said grid is fixedly related, the combination of: means for anchoring a first end of a length of wire; the second end of the wire being free to move toward the first end; means for applying a tensile stress to the second end of the wire, of a constant value irrespective of the movement of said second end; means for disposing a section of said length in a rectilinear path; means for pulling in a direction transverse to the direction of said path a first parallel sided, closely spaced, loop of wire from a portion of said section, whereby said second end is moved toward said first end; and means for similarly forming other parallel sided loops of wire successively, each closely spaced from the last preceding formed loop, progressing from said first loop toward the movable end of the wire, each loop being held to form, during the formation of all subsequently formed loops.

12. The combination defined in claim 11, in which said means for forming a parallel sided loop comprises a pair of adjacent wire holding means arranged along one side of said path and a single wire holding means on the opposite side of said path and means for relatively moving said pair of and said single wire holding means in opposite directions transversely of said path so as to engage said wire from opposite sides, all of said wire holding means being of the same width and the spacing on centers of said pair of holding means being approximately twice the width of a holding means plus twice the diameter of the wire.

13. The combination defined in claim 11, in which said means for forming a parallel sided loop comprises a pair of adjacent wire holding means arranged along one side of said path and a single wire holding means on the opposite side of said path and means for relatively moving said pair of and said single wire holding means in opposite directions transversely of said path so as to engage said wire from opposite sides, and in addition thereto; means for moving a sheet of flexible backing to a plane parallel to and proximate the plane of said loops whereby the loops may be adhesively bonded to the backing; and means for simultaneously moving all the wire holding means at corresponding ends of the loops relatively toward all the wire holding means at opposite corresponding ends of the loops to disengage the loops for removing the assembled backing and loops.

WILLIAM D. VAN DYKE.